# 2,706,209

PURIFICATION OF CRUDE BENZENE

Ortwin Reitz, Heidelberg, and Wilhelm von Fuener, Ludwigshafen (Rhein), Germany, assignors to Badische Anilin- & Soda-Fabrik Aktiengesellschaft, Ludwigshafen am Rhein, Germany No Drawing. Application May 1, 1951, Serial No. 224,078

Claims priority, application Germany May 20, 1950

13 Claims. (Cl. 260—674)

This invention relates to a new and improved method of purifying crude benzene.

A standard method of purifying crude benzene comprises treating the benzene at high temperature and under pressure in the presence of catalysts insensitive to sulfur with hydrogen in such a manner that the benzene or any benzene homologues present undergo no or only a negligible change. The catalysts hitherto used in practice for this process consisted wholly or to a large extent of the oxides or sulfides of the metals of the 6th group of the periodic system, in particular of molybdenum, chromium and tungsten. The said expensive, highly active metal compounds, when used in comparatively small amounts on carriers, however failed to prove successful in prior art practice for the reason that this type catalysts becomes inactive after only a short time and moreover has but a poor catalytic action.

We have found that an active alumina prepared in a particular manner, i. e. an alumina obtained by precipitation from an aluminum salt or aluminate solution and subjecting the precipitate to a peptizing treatment, can efficiently be used as a carrier giving long-service catalysts of high activity. The oxides or sulfides of the metals of the 6th group of the periodic system, in particular of the left side thereof, as for example of molybdenum, chromium or tungsten, are applied to these carriers in an amount of from 5 to 25%, in particular from 8 to 15%. It is of advantage also to provide the said active alumina with oxides or sulfides of metals of the 8th group, in particular of nickel or cobalt. The proportion of the 8th group component should be lower than that of the 6th group component. In the usual case, the ratio of the amounts of the metal compounds of the 6th group to those of the 8th group in the ready-for-use catalyst should be from 10:8 to 10:1, more particularly 10:5 to 10:1.

The initial materials contemplated for treatment by the method according to this invention are crude benzenes, benzenes of middle boiling range and heavy benzenes. The catalyst is especially efficient for benzenes which have been produced at high temperature.

The refining hydrogenation generally proceeds at temperatures of from about 200° to 450° C. in the presence of flowing hydrogen in an amount of from 0.5 to 10 cubic metres per kilogram of crude benzene and under a pressure of 100 to about 300 atmospheres. The catalyst also allows of refining the benzene at pressures lower than 100 atmospheres. Consequently, pressures of, say, about 20 to 80 atmospheres can also be used. In the case of such low-pressure treatment, however, the catalyst need be regenerated from time to time by burning off the carbonaceous substances deposited thereon. The activity of the catalyst, however, continues so that it can be used for several weeks, up to 1 to 2 months, without needing regeneration. At higher pressures, as for example above 100 atmospheres, the catalyst is stable for a long time, for example one or more years. The hydrogenating gas may be pure hydrogen or gases containing hydrogen, such as coke-oven gas, watergas, illuminating gas, town gas or other industrial gases.

The throughput and the reaction conditions (temperature, pressure and amount of hydrogen) are so correlated that the boiling range of the initial material is not modified in a substantial degree. In a preferred embodiment of our invention reaction is carried out with increasing temperatures. For this purpose, the catalyst layer may be feasibly subdivided into two parts, a temperature of 180° to 250° C. prevailing in the part through which the initial material first flows and a temperature of 300° to 450° C. in the part through which it flows afterwards. It is advantageous to use an active alumina which contains both oxides and sulfides of the metals of the 6th and 8th groups at the lower temperatures.

The active alumina is prepared as follows:

The initial material may be, for example, an aqueous solution of an aluminum salt, which is precipitated with ammonia. It is advantageous to carry out the precipitation in a stirring or shaking vessel. When starting from an alkali aluminate solution, the preferred way of precipitating the hydroxide is by adding acid until a pH value below 7 is set up. The hydroxide separated is practically stripped from alkali by washing.

The precipitate obtained in either way, if desired after having been pre-dried, is peptized to a paste or sludge with acid, shaped, dried and activated by careful heating to 450° to 500° C. The oxide may then be washed again with ammonia water and again calcined at about 450° C. In certain cases it may be advantageous then to raise the temperature to 500° to 700° C. According to a preferred embodiment of this invention nitric acid is used for the peptization as well as for the precipitation of the aluminate solution.

The alumina carrier prepared in the said manner has a high absorption power, a very low piled weight, a long life in service at high temperatures and, in combination with the heavy metal compounds listed above, a particularly great catalytic activity although the said high-quality compounds are present in smaller amounts than in the known catalysts above described.

The following example will further illustrate this invention but the invention is not restricted to this example.

Example

To a sodium aluminate solution (containing 100 grams of Al$_2$O$_3$ per litre) dilute nitric acid is added up to a temperature of 50° C. while stirring vigorously and in such an amount that the mixture has a pH value of 5.5 to 6. The precipitate is filtered off, made into a suspension with distilled water and thoroughly washed until free from alkali. The cake is dried at 200° C., ground and peptized to a pasty consistency with about 2% nitric acid.

The paste is spread on plates, dried, cut into cubes, again slowly dried and calcined at 400° to 500° C. The cubes are washed with 5% ammonia and heated for 6 hours at about 450° C. They are then soaked with an ammoniacal MoO$_3$-solution so that about 10% of MoO$_3$ are absorbed. After the soaking they are dried at 140° C., soaked with nickel carbonate in acetic acid solution and heated to 400° C. The active alumina then contains 10% of molybdic acid and 3% of nickel oxide. Two reaction vessels, arranged one behind the other, are employed. The first is filled with the catalyst prepared in the said manner and the second reaction vessel contains active alumina which is only provided with 10% of molybdic acid but which otherwise has been prepared in the same way as the catalyst above.

A mixture of crude and heavy benzene containing 15% of constituents boiling above 200° C. is heated together with 2 cubic meters of hydrogen under a pressure of 50 atmospheres to 230° C. and led at this temperature through the first reaction vessel. The reaction products then pass through a preheater into the second reaction vessel in which a temperature of 400° C. is maintained. The products are passed through the second reaction vessel at a rate of 1 kilogram per liter of catalyst volume per hour.

The catalyst is regenerated after one month's service, by burning off the carbonaceous deposits, and then used again.

A completely refined product is obtained without the aromatic hydrocarbons being hydrogenated, and the boiling curve remains unchanged.

What we claim is:

1. A process for the purification of crude benzene without substantially changing the benzene which comprises subjecting said benzene to a temperature between about 180° C. and about 450° C. in the presence of hydrogen containing gases under a pressure between about 20 atmospheres and about 300 atmospheres and in the presence of a catalyst of the sulfur-insensitive type comprising an active alumina catalyst which contains a compound selected from the group consisting of oxides and sulfides of metals of the left side of the 6th group of the periodic system and also contains a compound selected from the group consisting of oxides and sulfides of metals of the 8th group of the periodic system, which catalyst has been prepared by a process which comprises precipitating alumina hydrate from a solution of an aluminum compound, peptizing the precipitate so obtained, calcining the peptized precipitate at a temperature in excess of about 400° C., and then applying said compounds to the alumina thus obtained.

2. A process as defined in claim 1 wherein the metal compounds are employed in proportions such that the 6th group metal compound is present in the catalyst product in greater proportion than is the 8th group metal compound.

3. A process as defined in claim 1 wherein the metal compounds are employed in proportions such that the 6th group metal compound and the 8th group metal compound are present in the catalyst product in a ratio of from 10:8 to 10:1.

4. A process for the purification of crude benzene without substantially changing the benzene which comprises subjecting said benzene to a temperature between about 180° C. and about 450° C. in the presence of hydrogen containing gases under pressure between about 20 atmospheres and about 300 atmospheres and in the presence of a catalyst of the sulfurinsensitive type comprising an active alumina catalyst containing an oxide of molybdenum applied thereto, which catalyst has been prepared by a process which comprises precipitating alumina hydrate from a solution of an aluminate, washing the precipitate, peptizing the precipitate to a paste with an acid, calcining the peptized precipitate at a temperature of about 400° C. to 500° C., washing the calcined precipitate with aqueous ammonia, calcining the washed calcined precipitate at a temperature of about 450° C., and then applying said oxide of molybdenum to said precipitate.

5. A process for the purification of crude benzene without substantially changing the benzene which comprises subjecting said benzene to a temperature between about 180° C. and about 450° C. in the presence of hydrogen containing gases under a pressure between about 20 atmospheres and about 300 atmospheres and in the presence of a catalyst of the sulfurinsensitive type comprising an active alumina catalyst containing an oxide of molybdenum applied thereto, which catalyst has been prepared by a process which comprises precipitating alumina hydrate from a solution of an aluminate, washing the precipitate, peptizing the precipitate to a paste with an acid, calcining the precipitate at a temperature of about 400° C. to 500° C., washing the calcined precipitate with aqueous ammonia, calcining the washed calcined precipitate at a temperature of about 450° C. to 700° C., and then applying said oxide of molybdenum to said precipitate.

6. The process according to claim 5 in which the oxide of molybdenum is present in an amount between 5% and 25% based on the amount of the alumina.

7. The process according to claim 5 in which the crude benzene is subjected to a two-stage heating, the first stage being maintained at a temperature between about 180° C. and 250° C. and the second stage being maintained at a temperature between about 300° C. and 450° C.

8. A process for the purification of crude benzene without substantially changing the benzene which comprises subjecting said benzene to a temperature between about 180° C. and about 450° C. in the presence of hydrogen containing gases under a pressure between about 20 atmospheres and about 300 atmospheres and in the presence of a catalyst of the sulfur-insensitive type comprising an active alumina catalyst containing a sulfide of molybdenum applied thereto, which alumina catalyst has been prepared by a process which comprises precipitating alumina hydrate from a solution of an aluminate, washing the precipitate, peptizing the precipitate to a paste with an acid, calcining the peptized precipitate at a temperature of about 400° C. to 500° C., washing the calcined precipitate with aqueous ammonia, calcining the washed calcined precipitate at a temperature of about 450° C. to 700° C., and then applying said sulfide of molybdenum to said precipitate.

9. A process for the purification of crude benzene without substantially changing the benzene which comprises subjecting said benzene to a temperature between about 180° C. and about 450° C. in the presence of hydrogen containing gases under a pressure between about 20 atmospheres and about 300 atmospheres and in the presence of a catalyst of the sulfur-insensitive type comprising an active alumina catalyst containing an oxide of tungsten applied thereto, which alumina catalyst has been prepared by a process which comprises precipitating alumina hydrate from a solution of an aluminate, washing the precipitate, peptizing the precipitate to a paste with an acid, calcining the peptized precipitate at a temperature of about 400° C. to 500° C., washing the calcined precipitate with aqueous ammonia, calcining the washed calcined precipitate at a temperature of about 450° C. to 700° C., and then applying said oxide of tungsten to said precipitate.

10. A process for the purification of crude benzene without substantially changing the benzene which comprises subjecting said benzene to a temperature between about 180° C. and about 450° C. in the presence of hydrogen containing gases under a pressure between about 20 atmospheres and about 300 atmospheres and in the presence of a catalyst of the sulfur-insensitive type comprising an active alumina catalyst containing a sulfide of tungsten applied thereto, which alumina catalyst has been prepared by a process which comprises precipitating alumina hydrate from a solution of an aluminate, washing the precipitate, peptizing the precipitate to a paste with an acid, calcining the peptized precipitate at a temperature of about 400° C. to 500° C., washing the calcined precipitate with aqueous ammonia, calcining the washed calcined precipitate at a temperature of about 450° C. to 700° C., and then applying said sulfide of tungsten to said precipitate.

11. The process according to claim 8 in which the sulfide of molybdenum is present in an amount between 5% and 25% based on the amount of alumina.

12. The process according to claim 9 in which the oxide of tungsten is present in an amount between 5% and 25% based on the amount of alumina.

13. The process according to claim 10 in which the sulfide of tungsten is present in an amount between 5% and 25% based on the amount of alumina.

References Cited in the file of this patent

UNITED STATES PATENTS

| Number | Name | Date |
|---|---|---|
| 1,932,365 | Krauch et al. | Oct. 24, 1933 |
| 2,296,406 | Spicer et al. | Sept. 22, 1942 |
| 2,325,034 | Byrns | July 27, 1943 |
| 2,380,279 | Welty | July 10, 1945 |
| 2,394,751 | Cole | Feb. 12, 1946 |
| 2,410,558 | Webb et al. | Nov. 5, 1946 |
| 2,455,634 | Wilson et al. | Dec. 7, 1948 |
| 2,483,929 | Owen | Oct. 4, 1949 |
| 2,499,255 | Parker | Feb. 28, 1950 |